United States Patent [19]

Edwards

[11] Patent Number: 4,836,879
[45] Date of Patent: Jun. 6, 1989

[54] BINARY STRIP BONDING

[76] Inventor: Willie Edwards, 312 Kingston Dr., King, N.C. 27021

[21] Appl. No.: 48,753

[22] Filed: May 12, 1987

[51] Int. Cl.$^4$ .............................. C09J 7/02; C09J 5/04
[52] U.S. Cl. .................................. 156/330; 156/295; 156/313; 428/343; 427/208.6
[58] Field of Search .............. 156/330, 289, 313, 295; 428/343, 345, 346, 140; 427/208.6

[56] References Cited

U.S. PATENT DOCUMENTS

| | | | |
|---|---|---|---|
| 2,304,263 | 12/1942 | Lüty | 156/313 X |
| 3,049,836 | 8/1962 | Weissman | 156/295 X |
| 3,073,303 | 1/1963 | Schaar | 427/208.6 X |
| 3,351,515 | 11/1967 | Muttera, Jr. | 428/346 |
| 3,385,744 | 5/1968 | Van Sciver, II | 156/330 X |
| 3,551,270 | 12/1970 | Sharkey | 156/313 X |
| 3,657,379 | 4/1972 | Hilbelink et al. | 156/330 X |
| 3,837,981 | 9/1974 | Flint | 156/330 X |
| 4,229,473 | 10/1980 | Elber | 156/330 X |

Primary Examiner—Michael W. Ball
Assistant Examiner—Jeff H. Aftergut

[57] ABSTRACT

An improved method of chemical bonding wherein a bonding polymer and its corresponding curing agent are deposited on plastic strips with adhesive backings. When bonding is desired, then these strips are applied to the bondable structural surfaces and the exposed deposits are brought together through agitation, mixing the two components and initiating the bonding action.

3 Claims, 2 Drawing Sheets

BINARY STRIP BONDING

BACKGROUND

There are bonding methods on the market which employ many different techniques. In one case, the technique is used whereby an epoxy resin and its hardener are both dispensed from their respective containers simultaneously and, therefore, blended automatically. while such a method offers a significant degree of convenience, it still presents a somewhat bulky arrangement. Furthermore, one has to purchase a minimum volume of the substances in the kit form. Dispensed in convenient plastic strips of any quantity-pair, the invention offers a more readily available bonding method which requires absolutely no clean-up.

SUMMARY

It is the object of this invention to provide an improved method of chemical bonding using epoxy resins and their respective curing agents.

The method is based similarly upon the principle used in the application of the first-aid strip bandages commonly found in drug stores. These bandages, which are often used for injuries to the fingers, come complete with the working gauze padding already in place and ready to use. Like the medical bandages, the bonding implements come in different sizes and are sealed until they are ready to be applied.

DESCRIPTION OF THE PREFERRED EMBODIMENTS

Figure 1:
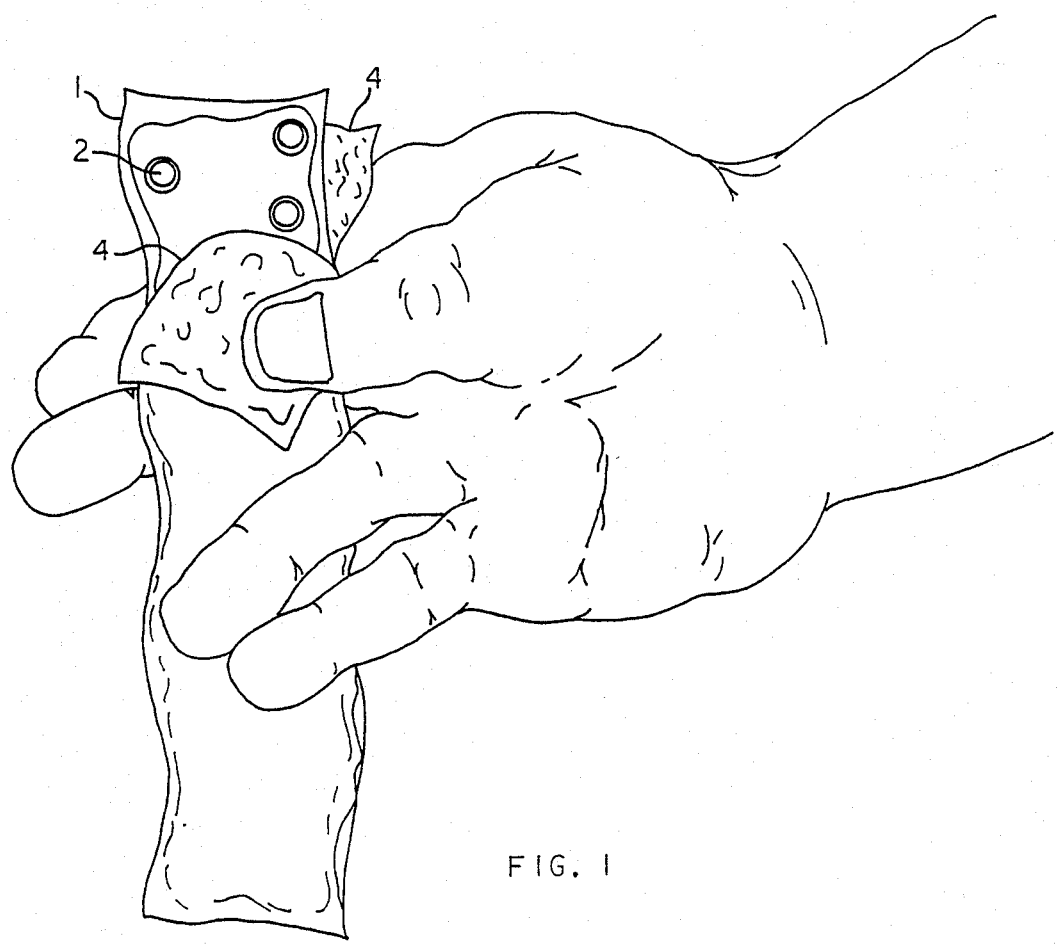
FIG. 1 is a view of the partially disclosed bonding implement with its protective seal partly removed.

Observing FIG. 1, it can be seen that the invention is a strip 1 which is sealed within a protective wrapper 4. The strip 1 is made of very thin plastic and is perforated 2 throughout its basic dimensions.

Figure 2:
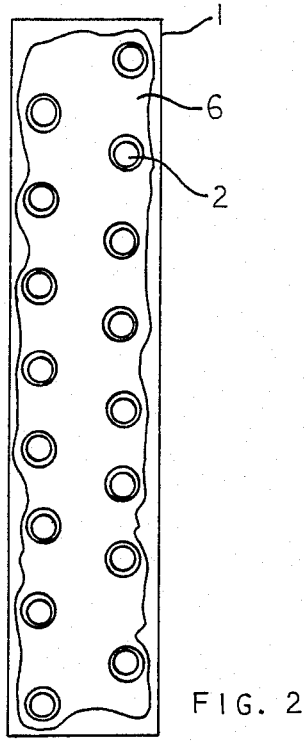
FIG. 2 is a view of the side of the bonding implement which has deposited upon it the bonding polymer.
Figure 3:
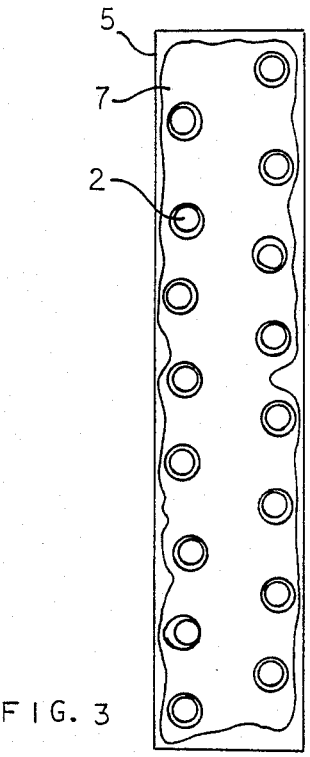
FIG. 3 is a view of the side of the bonding implement which has deposited upon it the bonding polymer curing agent.
Figure 4:
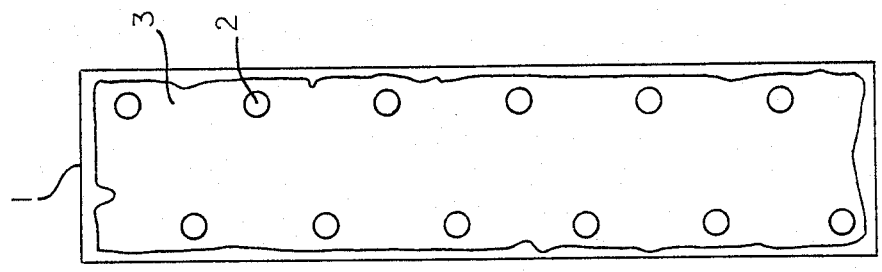
FIG. 4 is a back view of the bonding implement which has been rotated 180 degrees.

When the plastic strip 1 has been removed from its protective wrapper, as is shown in FIG. 2, then, what is revealed is a substance 6 which is deposited on one of the broad surfaces of the strip. This gelatinous deposit 6 is a bonding polymer. This bonding polymer 6 will form the bonding between two structural surfaces. The bonding polymer 6 requires a second compound, called a curing agent, to initate and complete the hardening process. The strip 1 is attached to one of the structural surfaces and held in place by its adhesive backing 3 of FIG. 4 and the second strip 5 of FIG. 3, upon which is applied the curing agent 7, is attached to the second structural surface by its adhesive backing. The adhesive backing 3 on the strips is a conventional sticking substance.

With the two strips 1 and 5 in place, and the bonding polymer 6 and its curing agent 7 exposed face-up, then they are merely brought together and agitated to mix the two chemicals and work them into the holes 2. The structures are held in the desired securing position until the bond sets. Primarily, it is through the holes 2 that surface-to-surface bonding of the structures takes place.

The plastic strips 1 and 5 are very thin, nevertheless it is not necessary for the two strips 1 and 5 to be permanently affixed one atop the other. They can be affixed offset so that, in finality, once the mixing is done, they reside one-thick to avoid a condition of standoff.

Figure 6:
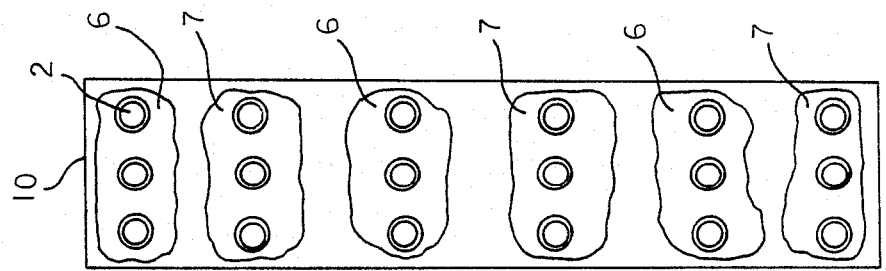
FIG. 6 is a view of the composite facet of the bonding implement of FIG. 5 with the side containing the bonding polymer and its curing agent exposed.
Figure 5:
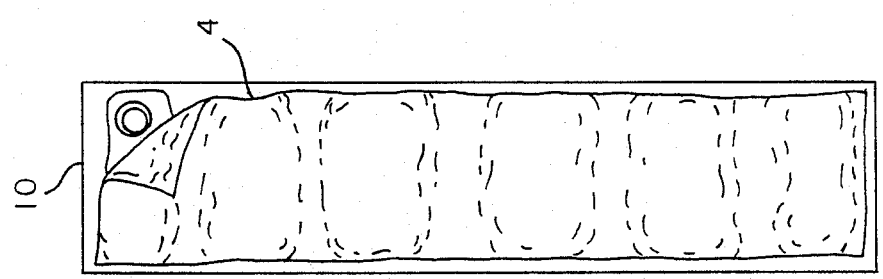
FIG. 5 is a view of the composite facet of the bonding implement within its protective seal.

While the above application requires two strips 1 and 5—one for the bonding polymer 6 and a second for the curing agent 7—the strip 10 of FIG. 6 has deposited on its single working surface both the bonding polymer 6 and the curing agent 7. To effect a bond, the strip is attached to one of the pertinent structural surfaces and agitated by the surface of the second structure, mixing and working the substances into the holes 2. The structures are held in place for setting. The composite strip 10—also shown in FIG. 5—has a protective seal 4 which is not removed until application is desired.

I claim:

1. A method of bonding two structural surfaces together using two tape implements comprising, affixing to a first of two said structural surfaces a first plastic tape having throughout its basic dimensions perforations and upon one side of said first plastic tape having deposited on a first side a conventional sticking substance for readily affixing said first plastic tape to first of two said structural surfaces, and having deposited on an opposite side of said first plastic tape a composition of uncured epoxy bonding agent, affixing to a second of two said structural surfaces a second plastic tape having throughout its basic dimensions perforations and upon one side of said second plastic tape being deposited on a first side a conventional sticking substance for readily affixing said second plastic tape to a second of two said structural surfaces, and having deposited on an opposite side of said second plastic tape a composition of epoxy curing agent, bringing said two structural surfaces together to which said plastic tapes are affixed, rubbing said two structural surfaces against each other to mix and work two said compositions into said perforations and mechanically securing said two structural surfaces until bonding is effected.

2. A method of bonding two structural surfaces together comprising, sandwiching a perforated tape, having on one side of said perforated tape a conventional sticking substance for attachment to one of said two structural surfaces and having on an opposite side of said perforated tape exposed gelatinous compositions of unmixed epoxy bonding resins and curing agents, wherein said conventional adhesive is attached to one of said two structural surfaces, mixing said gelatinous bonding compositions by rubbing said two structural surfaces together at place of said attachment of said perforated tape to effect a bonding action within said perforations between said two structures.

3. A method of bonding two structural surfaces together comprising, affixing to a first surface of said two structural surfaces a perforated plastic tape implement having a conventional sticking substance on one side to effect adhesion to said first surface, having alternately placed unmixed gelatinous deposits of uncured epoxy bonding resins and curing agents upon an opposite side of said perforated plastic tape implement, rubbing the second of said two structural surfaces against said perforated tape affixed to said first surface to effect mixing of said epoxy bonding resins and curing agents within said perforations thereby effecting a bonding action.

* * * * *